US011163882B2

(12) United States Patent
Takata et al.

(10) Patent No.: US 11,163,882 B2
(45) Date of Patent: Nov. 2, 2021

(54) ANALYSIS APPARATUS, ANALYSIS METHOD, AND ANALYSIS PROGRAM

(71) Applicant: NIPPON TELEGRAPH AND TELEPHONE CORPORATION, Tokyo (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 64 days.

(21) Appl. No.: 16/476,551

(22) PCT Filed: Aug. 10, 2017

(86) PCT No.: PCT/JP2017/029066
§ 371 (c)(1),
(2) Date: Jul. 9, 2019

(87) PCT Pub. No.: WO2018/131200
PCT Pub. Date: Jul. 19, 2018

(65) Prior Publication Data
US 2019/0325136 A1    Oct. 24, 2019

(30) Foreign Application Priority Data
Jan. 11, 2017   (JP) .............................. JP2017-002378

(51) Int. Cl.
*G06F 21/56* (2013.01)
*G06F 30/20* (2020.01)

(52) U.S. Cl.
CPC ............ *G06F 21/567* (2013.01); *G06F 30/20* (2020.01); *G06F 2221/033* (2013.01)

(58) Field of Classification Search
CPC ........ G06F 21/56; G06F 21/44; G06F 21/567; G06F 30/20; G06F 2221/033
(Continued)

(56) References Cited

U.S. PATENT DOCUMENTS

2010/0257592 A1* 10/2010 Wang .................. G06F 16/9566
726/3
2012/0144492 A1* 6/2012 Griffin .................... G06F 21/56
726/25
(Continued)

FOREIGN PATENT DOCUMENTS

JP   2014-71796 A    4/2014
WO  2015/087835 A1   6/2015
(Continued)

OTHER PUBLICATIONS

Google translation of Japanese Patent Publication JP2014071796A.*
(Continued)

*Primary Examiner* — Benjamin A Kaplan
(74) *Attorney, Agent, or Firm* — Xsensus LLP (57) ABSTRACT

An analysis apparatus has a transfer path matching unit that is provided with a real browser log La and a browser emulator log Lb as input and identifies, as a specific transfer path, a transfer path that is not transferred to a malicious URL on a pseudo-browser where the transfer path is transferred to the malicious URL on a real browser, based on the malicious URL information in a malicious URL database, and an analysis avoidance code identification unit that identifies an analysis avoidance code that avoids analysis by utilizing a browser-specific function or an implementation difference between the real-browser and the pseudo-browser, among script codes that are executed on a website, based on the specific transfer path.

6 Claims, 7 Drawing Sheets

(58) Field of Classification Search
USPC .......................................................... 726/23
See application file for complete search history.

(56) References Cited

U.S. PATENT DOCUMENTS

| 2014/0109228 | A1* | 4/2014 | Kalman ................ G06F 21/577 |
| | | | 726/25 |
| 2017/0228541 | A1 | 8/2017 | Takata et al. |
| 2017/0293477 | A1 | 10/2017 | Takata et al. |
| 2018/0145993 | A1 | 5/2018 | Akiyama et al. |

FOREIGN PATENT DOCUMENTS

| WO | 2016/024480 A1 | 2/2016 |
| WO | 2016/060110 A1 | 4/2016 |

OTHER PUBLICATIONS

International Search Report and Written Opinion dated Oct. 31, 2017 for PCT/JP2017/029066 filed on Aug. 10, 2017, 10 pages including English Translation of the International Search Report.

Lu et al., "BLADE: An Attack-Agnostic Approach for Preventing Drive-By Malware Infections", pp. 1-12.

Cova et al., "Detection and Analysis of Drive-by-Download Attacks and Malicious JavaScript Code", 10 pages.

Takata et al., "MineSpider: Extracting Hidden URLs Behind Evasive Drive-by Download Attacks", The Institute of Electronics, Information and Communication Engineers, vol. E99-D, No. 4, Apr. 2016, pp. 1-13.

Nikiforakis et al., "Cookieless Monster: Exploring the Ecosystem of Web-based Device Fingerprinting", 15 pages.

Torres et al., "FP-Block: usable web privacy by controlling browser fingerprinting", pp. 1-17.

"Vendor Prefix", 2 pages.

Kapravelos et al., "Revolver: An Automated Approach to the Detection of Evasive Web-based Malware", 15 pages.

Nelms et al., "WebWitness: Investigating, Categorizing, and Mitigating Malware Download Paths", 24th USENIX Security Symposium, Aug. 12-14, 2015, Washington D.C., pp. 1025-1040.

Nagai, "Multi Kankyo deno Drive-by-Download Kogeki no Link Kozo Kaiseki ni Tsuite", IEICE Technical Report, vol. 116, No. 80, Jun. 6, 2016, pp. 63-68 (With English Translation).

Decision to Grant a Patent dated Feb. 18, 2020 in Japanese Application No. 2018-561795.

* cited by examiner

ANALYSIS APPARATUS, ANALYSIS METHOD, AND ANALYSIS PROGRAM

CROSS-REFERENCE TO RELATED APPLICATIONS

The present application is based on PCT filing PCT/JP2017/029066, filed Aug. 10, 2017, which claims priority to JP 2017-002378, filed Jan. 11, 2017, both of which are incorporated herein by reference.

FIELD

The present invention relates to an analysis apparatus, an analysis method, and an analysis program.

BACKGROUND

A Drive-by Download attack (Drive-by Download attacks) is/are an attack(s) such that a client that accesses a website is transferred to a different website by principally using a Hyper Text Markup Language (HTML) tag or JavaScript (registered trademark) and is subsequently transferred to a malicious website for executing an attack code. As a client accesses a malicious website, an attack code that exploits vulnerability of a web browser (that will be referred to as a browser below) or a browser plug-in (that will be referred to as a plug-in below) is executed to download or install a malicious program (malware) such as a computer virus. Additionally, a Uniform Resource Locator (URL) of a website where an attack code is executed thereon or a website that downloads malware will be referred to as a malicious URL below.

For a method of detecting a Drive-by Download attack, a method is provided that detects a change in a file system that is caused by accessing a malicious website on a browser of a real system (that will be referred to as a real browser below) and downloading or installing malware (see, for example, non-patent literature 1). Furthermore, for another method of detecting a Drive-by Download attack, a method is also provided that detects a malicious JavaScript by executing such JavaScript on an emulator of a browser (that will be referred to as a pseudo-browser below) and analyzing a result of such execution or the like (see, for example, non-patent literature 2).

Against such a detection method, an attacker changes a control flow of JavaScript in such a manner that, before transferring an accessing client to a malicious URL, a type or a version of such a client (that will be referred to as browser finger printing below) is identified and only a client that is a predetermined target of attack is transferred to the malicious URL, so that a success rate of attack is improved (see, for example, non-patent literature 3).

For browser finger printing, for example, a method of managing a client individually by using a Hyper Text Transfer Protocol (HTTP) cookie (cookies), a method of identifying a client by using a function of JavaScript, and a method of identifying a client by using a function of a plug-in are known generally.

Any of such methods utilizes a function that is implemented in a browser or a plug-in to identify a character string or a numerical value for a type, a version, or an identifier of the browser or the plug-in. Hence, a code of browser finger printing is relatively readily detected and identified.

Meanwhile, browser finger printing that utilizes a browser-specific function exists (see, for example, non-patent literature 4, non-patent literature 5, and non-patent literature 6).

Furthermore, a malicious website may use a browser-specific function or generate an intentional exception process to use a code that avoids or interrupts analysis that is based on an existing method in such a manner that it is impossible for a client other than a target of attack to execute such analysis (that will be referred to as an analysis avoidance code below) (see, for example, non-patent literature 7).

For such an analysis avoidance code, for example, a method is provided that exploits a difference of interpretation of a web content that is caused by a rendering engine or a JavaScript engine that is used in each browser. In particular, a pseudo-browser is frequently implemented so as to simulate a general function on a real browser and a browser-specific function is not implemented therein, so that it is impossible to execute (interpret) an analysis avoidance code.

Furthermore, an analysis avoidance code uses a function that is not generally disclosed, so that it is impossible to execute monitoring or identify a code to be analyzed, even on a real browser, and it is difficult to take a measure.

As a malicious website is created by a tool that is referred to as an exploit kit, multiple transfers, a browser finger printing code, and an analysis avoidance code as described above are automatically incorporated therein. Hence, it is used in a lot of malicious websites in recent years.

Therefore, it is important to take a measure in such a manner that an analysis avoidance code as described above is identified and such a code is interpreted by an existing technique, in analyzing or detecting a malicious website in the future.

CITATION LIST

Non-Patent Literature

Non-Patent Literature 1: L. Lu, V. Yegneswaran, P. Porras, and W. Lee, "BLADE: An Attack-Agnostic Approach for Preventing Drive-By Malware Infections", Proc. ACM on Conference Computer and Communications Security, pp. 440-450, 2010.

Non-Patent Literature 2: M. Cova, C. Kruegel, and G. Vigna, "Detection and Analysis of Drive-by-Download Attacks and Malicious JavaScript Code", Proc. World Wide Web Conference, pp. 281-290, 2010.

Non-Patent Literature 3: Y. Takata, M. Akiyama, T. Yagi, T. Hariu, and S. Goto, "MineSpider: Extracting Hidden URLs Behind Evasive Drive-by Download Attacks", IEICE Trans. Information and System, vol. E99.D, no. 4, pp. 860-872, 2016.

Non-Patent Literature 4: N. Nikiforakis, A. Kapravelos, W. Joosen, C. Kruegel, F. Piessens, and G. Vigna, "Cookieless Monster: Exploring the Ecosystem of Web-based Device Fingerprinting", Proc. IEEE Symposium on Security and Privacy, 2013.

Non-Patent Literature 5: C. F. Torres, H. Jonker, and S. Mauw, "FP-Block: usable web privacy by controlling browser fingerprinting", Proc. European Symposium on Research in Computer Security, pp. 1-17, 2015.

Non-Patent Literature 6: Mozilla Developer Network, "Vendor Prefix", [online], [retrieved on Nov. 7, 2016], Internet <URL: https://developer.mozilla.org/en-US/docs/Glossary/Vendor_Prefix>

Non-Patent Literature 7: A. Kapravelos, Y. Shoshitaishvili, M. Cova, C. Kruegel, and G. Vigna, "Revolver: An Automated Approach to the Detection of Evasive Web-based Malware", In Proceedings of the USENIX Security Symposium, 2013.

SUMMARY

Technical Problem

Thus, a method of transferring only a specific browser to a malicious URL by using browser finger printing has conventionally been known as one method for a Drive-by Download attack. Then, for a method of detecting or identifying a Drive-by Download attack, some methods of accessing a malicious URL on a real browser or a pseudo-browser to analyze an operation thereof have been proposed.

However, a browser-specific function is frequently not implemented in an existing technique that uses a pseudo-browser, and hence, there is a problem in that, against a Drive-by Download attack that uses an analysis avoidance code that exploits a browser-specific function or an implementation difference between a real browser and a pseudo-browser, it is impossible to interpret the analysis avoidance code and it is impossible to analyze a website. Furthermore, there is a problem in that it is difficult for an analysis avoidance code to identify a function to be exploited or an implementation difference.

The present invention is provided by taking the above into consideration and aims to provide an analysis apparatus, an analysis method, and an analysis program that are capable of identifying, as an analysis target, an analysis avoidance code that avoids analysis, by utilizing a browser-specific function or an implementation difference between a real browser and a pseudo-browser, among all of script codes that are executed on an analysis target website.

Solution to Problem

An analysis apparatus that analyzes a content and a script code on a website, wherein the analysis apparatus includes: a transfer path matching unit that is provided with, as input, an access log for a Uniform Resource Locator (URL) of a website as an analysis target on a real browser that is a browser of a real system and an access log for the URL of a website as an analysis target on a pseudo-browser that simulates environment of the real browser and identifies, as a specific transfer path, a transfer path that is not transferred to a malicious URL on the pseudo-browser where the transfer path is transferred to the malicious URL on the real browser, based on the malicious URL; and an identification unit that identifies an analysis avoidance code that avoids analysis by utilizing a browser-specific function or an implementation difference between the real-browser and the pseudo-browser, among script codes that are executed on the website, based on the specific transfer path.

Advantageous Effects of Invention

According to the present invention, it is possible to identify, as an analysis target, an analysis avoidance code that avoids analysis, by utilizing a browser-specific function or an implementation difference between a real browser and a pseudo-browser, among all of script codes that are executed on an analysis target website.

DESCRIPTION OF EMBODIMENTS

Hereinafter, an embodiment of the present invention will be explained in detail with reference to the drawings. Additionally, the present invention is not limited by such an embodiment. Furthermore, in a depiction of a figure, an identical sign is provided to indicate an identical part.

[Embodiment]

An embodiment of the present invention will be explained. In an embodiment of the present invention, an analysis apparatus, an analysis method, and an analysis program will be explained that analyze a content and a script code of a website. First, an outline of an analysis apparatus in an embodiment will be explained.

[Configuration of Analysis Apparatus]

Figure 1:
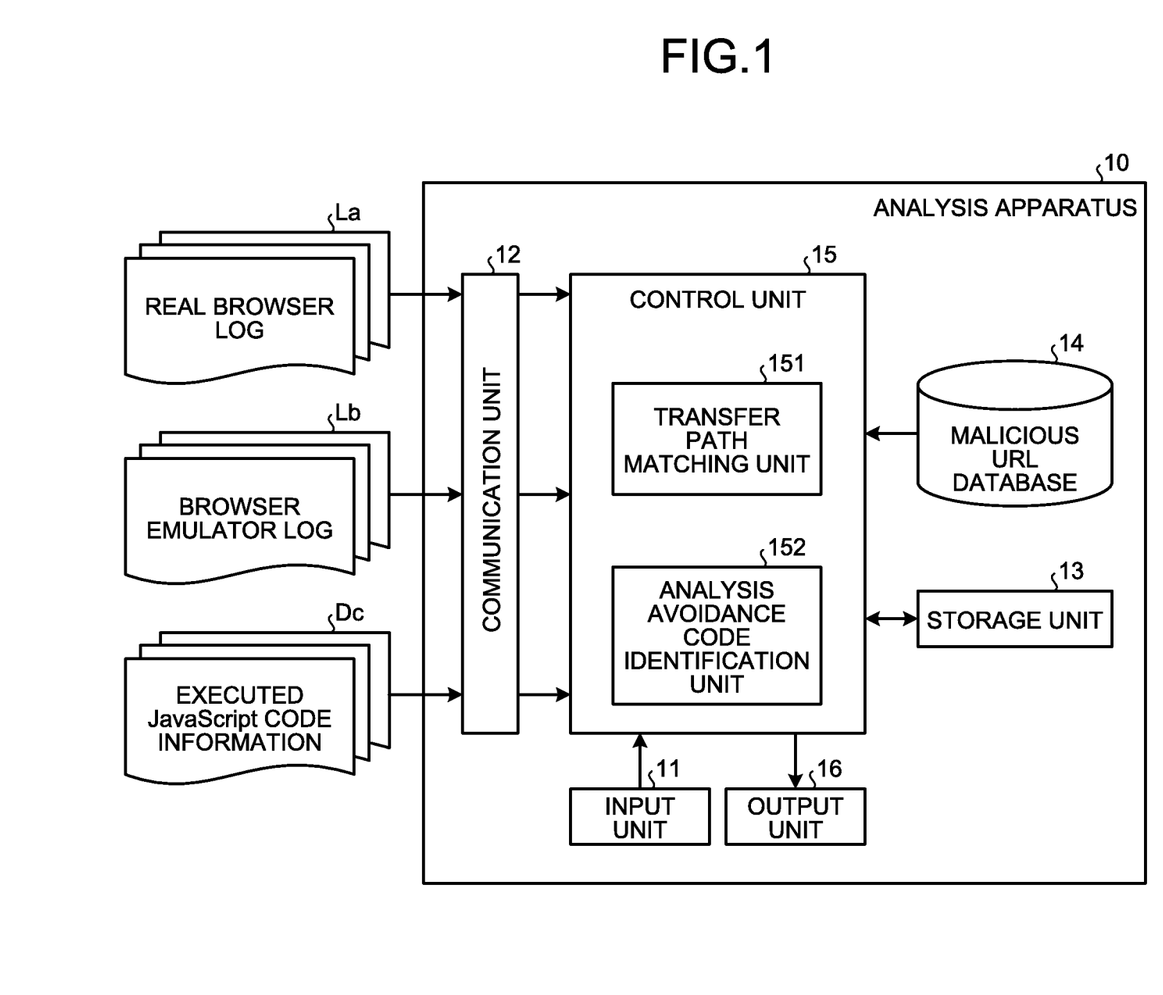
FIG. 1 is a block diagram illustrating a configuration of an analysis apparatus according to the present embodiment.

FIG. 1 is a block diagram illustrating a configuration of an analysis apparatus according to the present embodiment. As illustrated in FIG. 1, an analysis apparatus 10 has an input unit 11, a communication unit 12, a storage unit 13, a malicious URL database 14, a control unit 15, and an output unit 16. The analysis apparatus 10 uses a specific function of a web browser or an implementation difference between a real browser and a pseudo-browser to identify a type or a version of such a browser and identify an analysis avoidance code that avoids analysis. Additionally, in the embodiment, a case where a JavaScript code among script codes is analyzed will be explained as an example.

The input unit 11 is an input interface that receives a variety of operations from an operator of the analysis apparatus 10. For example, the input unit 11 is composed of an input device such as a touch panel, a sound input device, a keyboard, or a mouse.

The communication unit 12 is a communication interface that transmits a variety of information to or receives it from another device that is connected through a network or the like. The communication unit 12 is realized by a Network Interface Card (NIC) or the like and executes communication between another device and the control unit 15 through a telecommunication line such as a Local Area Network (LAN) or the Internet.

Specifically, the communication unit 12 inputs, to the control unit 15 through a network or the like, a real browser log La that is an access log for an analysis target website that is acquired on a real browser that is a browser of a real system. Then, the communication unit 12 inputs, to the control unit 15 through a network or the like, a browser emulator log Lb (an access log on a pseudo-browser) that is an access log for an analysis target website that is acquired on a pseudo-browser that simulates environment of a real browser that operates such a real browser (an Operating System (OS), a browser, or a plug-in). The real browser log La and the browser emulator log Lb that are input through such a communication unit 12 are logs in a case where a URL of an identical analysis target website is accessed thereon. Then, the real browser log La includes a log that is transferred to a malicious URL and the browser emulator log Lb does not include such a log that is transferred to a malicious URL.

Additionally, a pseudo-browser simulates environment where a real browser is operated. Furthermore, a pseudo-browser simulates a browser type identical to that of a real browser and a version identical thereto but internal implementation thereof is different from that of the real browser. This is because, in a case where a pseudo-browser simulates environment that is different from environment where a real browser is operated, even a usual browser finger printing code without an analysis avoidance code is an analysis target. This similarly applies to a case where a real browser in a different environment is used instead of a pseudo-browser.

Moreover, the communication unit 12 inputs, to the control unit 15 through a network or the like, executed JavaScript code information Dc that indicates a JavaScript code that is executed on such a website.

The storage unit 13 is realized by a semiconductor memory element such as a Random Access Memory (RAM) or a flash memory (Flash Memory) or a storage device such as a hard disk or an optical disk and stores therein a processing program that operates the analysis apparatus 10, data that are used during execution of the processing program, and the like.

The malicious URL database 14 is a database that records a known malicious URL. The malicious URL database 14 records a known malicious URL such as an antivirus one. Furthermore, such a known malicious URL may be a URL that is detected by a known attack detection method (see, for example, non-patent literature 1 and non-patent literature 2). A transfer path matching unit 151 (as described later) matches a matching target URL to a malicious URL that is recorded in the malicious URL database 14 to identify such a malicious URL. Additionally, the analysis apparatus 10 is not limited to a configuration that has the malicious URL database 14 but may be configured to record, in the storage unit 13, a list that records known malicious URLs.

The control unit 15 has an internal memory for storing a program that defines a variety of process steps or the like and a needed data and executes a variety of processes based thereon. For example, the control unit 15 is an electronic circuit such as a Central Processing Unit (CPU) or a Micro Processing Unit (MPU). The control unit 15 has a transfer path matching unit 151 and an analysis avoidance code identification unit 152 (an identification unit).

The transfer path matching unit 151 is provided with the real browser log La and the browser emulator log Lb as input and identifies, as a specific transfer path, a transfer path that is not transferred to a malicious URL on a pseudo-browser where the transfer path is transferred to the malicious URL on a real browser, based on the malicious URL. The transfer path matching unit 151 creates respective transfer graphs from access logs that are acquired on a real browser and a pseudo-browser (the real browser log La and the browser emulator log Lb). Then, the transfer path matching unit 151 matches respective transfer paths to one another in created two transfer graphs to identify a specific transfer path.

Specifically, the transfer path matching unit 151 creates transfer graphs based on transfer source URL information and transfer destination URL information that are included in the real browser log La and the browser emulator log Lb (for details, see, for example, T. Nelms, R. Perdisci, M. Antonakakis, and M. Ahamad, "WebWitness: Investigating, Categorizing, and Mitigating Malware Download Paths", in Proceedings of USENIX Security Symposium, 2015).

Then, the transfer path matching unit 151 matches respective transfer paths in created transfer graphs to one another. The transfer path matching unit 151 matches a URL in each transfer path to a malicious URL that is recorded in the malicious URL database 14 to identify such a malicious URL in each transfer path. Subsequently, the transfer path matching unit 151 identifies a transfer path that is not transferred to a malicious URL on a pseudo-browser where the transfer path is transferred to the malicious URL on a real browser. In other words, the transfer path matching unit 151 identifies, as a specific transfer path, a transfer path for a pseudo-browser that corresponds to a transfer path to a malicious URL that is included in a real browser, based on matched transfer paths. Additionally, the transfer path matching unit 151 matches transfer paths by using a domain name, a path, a query key, or a query value.

The analysis avoidance code identification unit 152 identifies an analysis avoidance code among JavaScript codes that are included in the JaveScript code information Dc that is executed on an analysis target website, based on a specific transfer path that is identified by the transfer path matching unit 151. An analysis avoidance code is a code that avoids analysis by utilizing a browser-specific function or an implementation difference between a real browser and a pseudo-browser.

Specifically, the analysis avoidance code identification unit 152 identifies a terminal URL that is a URL at a terminal of a specific transfer path that is identified by the transfer path matching unit 151. The analysis avoidance code identification unit 152 identifies, as an analysis avoidance code, a JavaScript code that is executed due to access to an identified terminal URL, among JavaScript codes that are included in the executed JaveScript code information Dc. In other words, the analysis avoidance code identification unit 152 identifies, as an analysis avoidance code, a JavaScript code that is executed by an identified terminal URL.

The output unit 16 is realized by, for example, a display device such as a liquid crystal display, a printing device such as a printer, an information communication device, or the like. The output unit 16 outputs a result of analysis or the like to an operator.

[Process of Transfer Path Matching Unit]

Figure 2:
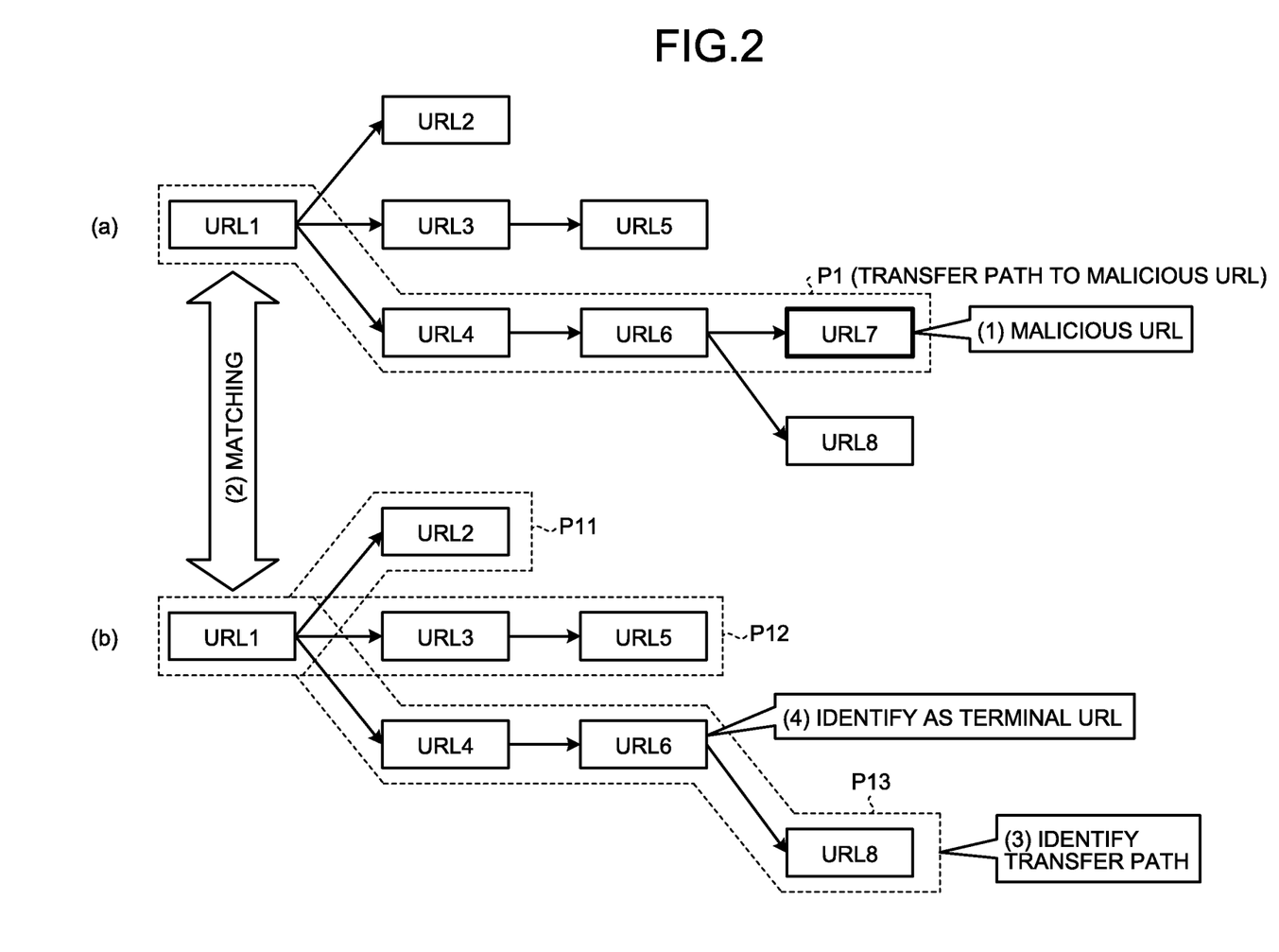
FIG. 2 is a diagram for explaining a process of a transfer path matching unit as illustrated in FIG. 1.

Next, a process of the transfer path matching unit 151 will be explained specifically. FIG. 2 is a diagram for explaining a process of the transfer path matching unit 151 as illustrated in FIG. 1. FIG. 2 illustrates an example of transfer graphs that are created by two access logs on a real browser and a pseudo-browser. FIG. 2(a) illustrates a transfer graph that is created from the real browser log La and FIG. 2(b) illustrates a transfer graph that is created from the browser emulator log Lb.

Specifically, the transfer path matching unit 151 creates a transfer graph by using the real browser log La as illustrated in FIG. 2(a) to acquire transfer paths (URL1, URL2), (URL1, URL3, URL5), (URL1, URL4, URL6, URL7), and (URL1, URL4, URL6, URL8) in the real browser log La. Furthermore, the transfer path matching unit 151 creates a transfer graph by using the browser emulator log Lb as illustrated in FIG. 2(b) to acquire transfer paths P11 (URL1, URL2), P12 (URL1, URL3, URL5), and P13 (URL1, URL4, URL6, URL8) on a pseudo-browser.

Herein, a case where URL7 is a malicious URL will be explained as an example. In such a case, the transfer path matching unit 151 refers to the malicious URL database 14, and thereby, identifies URL7 in a transfer path P1 (URL1, URL4, URL6, URL7) on a real browser as being a malicious URL (see (1) in FIG. 2). Then, the transfer path matching unit 151 identifies the transfer path P1 on a real browser that includes URL 7 that is such a malicious URL as being a transfer path to the malicious URL.

Subsequently, the transfer path matching unit 151 matches a transfer path on a pseudo-browser to a transfer path on a real browser (see (2) in FIG. 2). Then, the transfer path matching unit 151 identifies, among the transfer paths P11 to P13 on a pseudo-browser, the transfer path P13 (URL1, URL4, URL6, URL8) with a greatest number of URLs identical to those of the transfer path P1 to a malicious URL on a real browser, as being a specific transfer path that is a transfer path that is not transferred to the malicious URL on the pseudo-browser where the transfer path is transferred to the malicious URL on the real browser (see (3) in FIG. 2).

Then, the analysis avoidance code identification unit 152 identifies URL 6 as a terminal URL on a common node between the transfer path P1 on a real browser and the transfer path P13 that is identified on a pseudo-browser (see (4) in FIG. 2). Additionally, URL8 in the transfer path P13 on a pseudo-browser is not included in a transfer path on a real browser, and hence, is excluded from a target of identification of a terminal URL.

Thereby, the analysis avoidance code identification unit 152 identifies, as an analysis avoidance code, a JavaScript code that is executed by URL6 that is a terminal URL that is identified by the transfer path matching unit 151.

Figure 3:
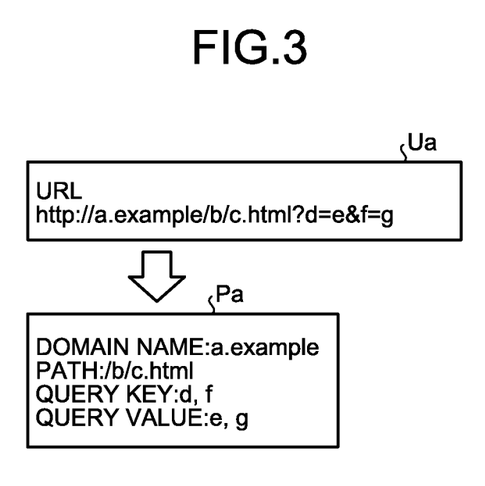
FIG. 3 is a diagram for explaining decomposition of a URL that is executed by a transfer path matching unit as illustrated in FIG. 1.

Subsequently, another example of a process of the transfer path matching unit 151 will be explained. FIG. 3 is a diagram for explaining decomposition of a URL that is executed by the transfer path matching unit 151 as illustrated in FIG. 1. As illustrated in FIG. 3, the transfer path matching unit 151 decomposes a URL into a domain name, a path, a query key, and a query value. For example, the transfer path matching unit 151 decomposes "URL: http://a.example/b/c.html?d=e&f=g" as illustrated in a frame Ua into "DOMAIN NAME: a.example", "PATH: /b/c.html", "QUERY KEY: d, f", and "QUERY VALUE: e, g" as illustrated in a frame Pa.

Figure 4:
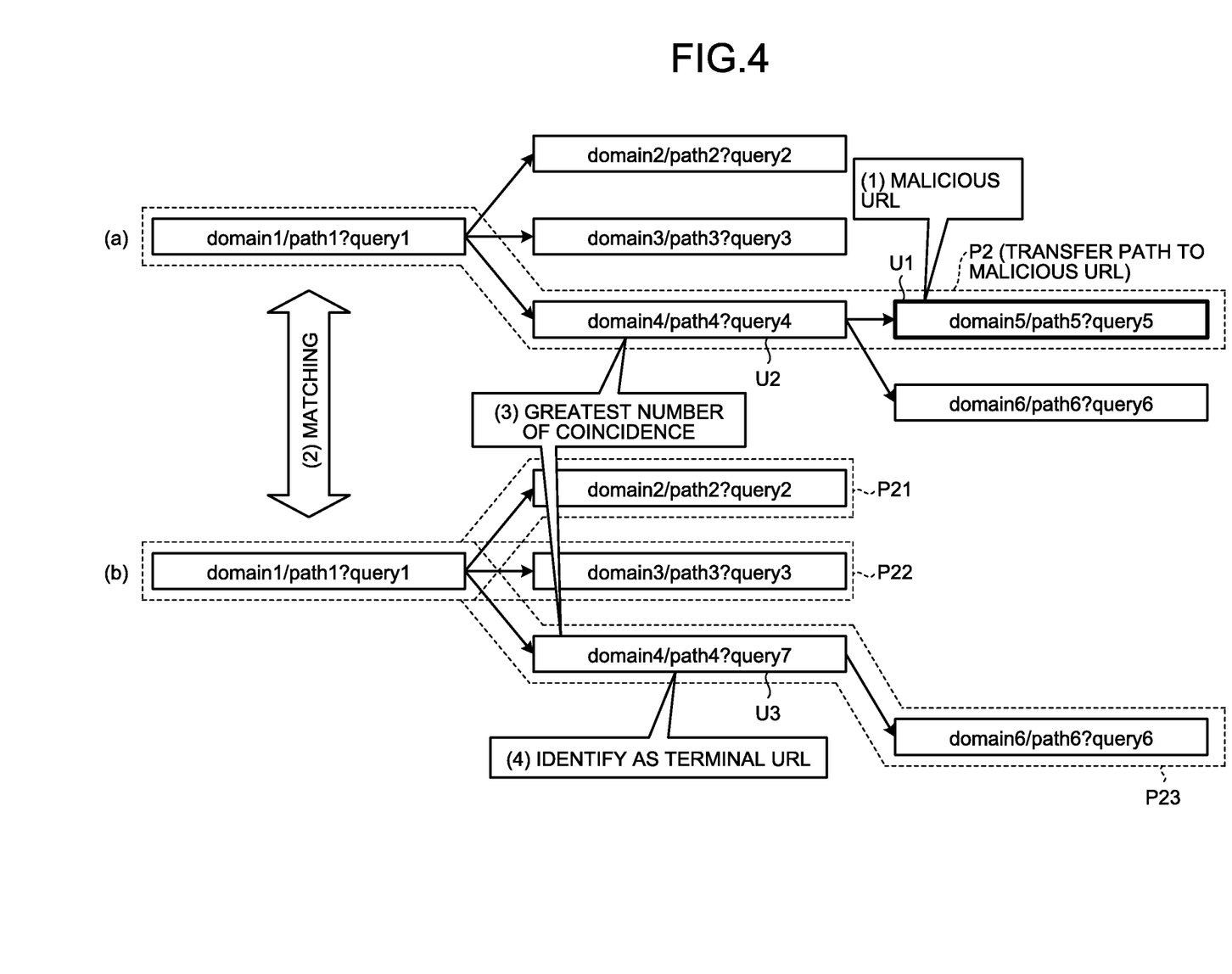
FIG. 4 is a diagram for explaining a process of a transfer path matching unit as illustrated in FIG. 1.

Then, the transfer path matching unit 151 decomposes each transfer path into a domain name, a path, a query key, and a query value and matches transfer paths to one another by using a decomposed domain name, path, query key, and query value of each thereof. FIG. 4 is a diagram for explaining a process of the transfer path matching unit 151 as illustrated in FIG. 1. FIG. 4 illustrates an example of transfer graphs that are created by two access logs on a real browser and a pseudo-browser where a URL is represented to be decomposed into a domain name, a path, a query key, and a query value as explained in FIG. 3. FIG. 4(a) illustrates a transfer graph that is created from the real browser log La and FIG. 4(b) illustrates a transfer graph that is created from the browser emulator log Lb.

Specifically, the transfer path matching unit 151 acquires transfer paths (domain1/path1?query1, domain2/path2?query2), (domain1/path1?query1, domain3/path3?query3), (domain1/path1?query1, domain4/path4?query4, domain5/path5?query5), and (domain1/path1?query1, domain4/path4?query4, domain6/path6?query6) for the real browser log La as illustrated in FIG. 4(a). Furthermore, the transfer path matching unit 151 acquires transfer paths P21 (domain1/path1?query1, domain2/path2?query2), P22 (domain1/path1?query1, domain3/path3?query3), and P23 (domain1/path1?query1, domain4/path4?query7, domain6/path6?query6) for the browser emulator log Lb as illustrated in FIG. 4(b).

Herein, a case where "domain5/path5?query5" is a malicious URL will be explained as an example. In such a case, the transfer path matching unit 151 identifies "domain5/path5?query5" in a transfer path P2 on a real browser (see a frame U1 in FIG. 4(a)) as being a malicious URL (see (1) in FIG. 4). Then, the transfer path matching unit 151 identifies the transfer path P2 on a real browser that includes "domain5/path5?query5" as being a transfer path to a malicious URL.

Then, the transfer path matching unit 151 matches a transfer path on a pseudo-browser to a transfer path on a real browser (see (2) in FIG. 4). In such a case, a number of identical URLs in any transfer path among the transfer paths P21 to P23 on a pseudo-browser is equal to that of the transfer path P2 on a real browser at a granularity of a URL. That is, two URLs of "domain1/path1?query1" and "domain2/path2?query2", "domain3/path3?query3" or "domain6/path6?query6" in any transfer path among the transfer paths P21 to P23 on a pseudo-browser are identical to those of the transfer path P2 on the real browser log La.

In such a case, the transfer path matching unit 151 executes matching at a granularity of a domain name, a path, a query key, or a query value, regards URLs with a greatest number of coincidence at each granularity as identical, and executes matching of transfer paths.

Specifically, the transfer path matching unit 151 obtains a URL on a pseudo-browser with a greatest number of coincidence with a URL of "domain4/path4?query4" in the transfer path P2 on a real browser (see a frame U2 in FIG. 4) among the transfer paths P21 to P23 on the pseudo-browser (see (3) in FIG. 4).

In an example of FIG. 4, the transfer path matching unit 151 obtains "domain4/path4?query7" in the transfer path P23 (see a frame U3 in FIG. 4) as a URL on a pseudo-browser with a greatest number of coincidence with a URL of "domain4/path4?query4" in the transfer path P2 on a real browser. Then, the transfer path matching unit 151 regards such "domain4/path4?query7" in the transfer path P23 (see the frame U3 in FIG. 4) as identical to a URL of "domain4/path4?query4" in the transfer path P2 on a real browser (see the frame U2 in FIG. 4).

Additionally, the transfer path matching unit 151 may execute matching in view of all of a domain name, a path, a query key, and a query value as a matching granularity of a URL or may change a matching process in view of one of a domain name, a path, a query key, and a query value.

Subsequently, the analysis avoidance code identification unit 152 identifies, as a terminal URL, "domain4/path4?query7" in the transfer path P23 (domain1/path1?query1, domain4/path4?query7, domain6/path6?query6) on a pseudo-browser (see (4) in FIG. 4). Additionally, "domain6/path6?query6" in the transfer path P23 on a pseudo-browser is excluded from a target of identification of a terminal URL.

Then, the analysis avoidance code identification unit 152 identifies, as an analysis avoidance code, a JavaScript code that is executed by "domain4/path4?query7" that is an identified terminal URL.

[Process Steps of Analysis Process]

Figure 5:
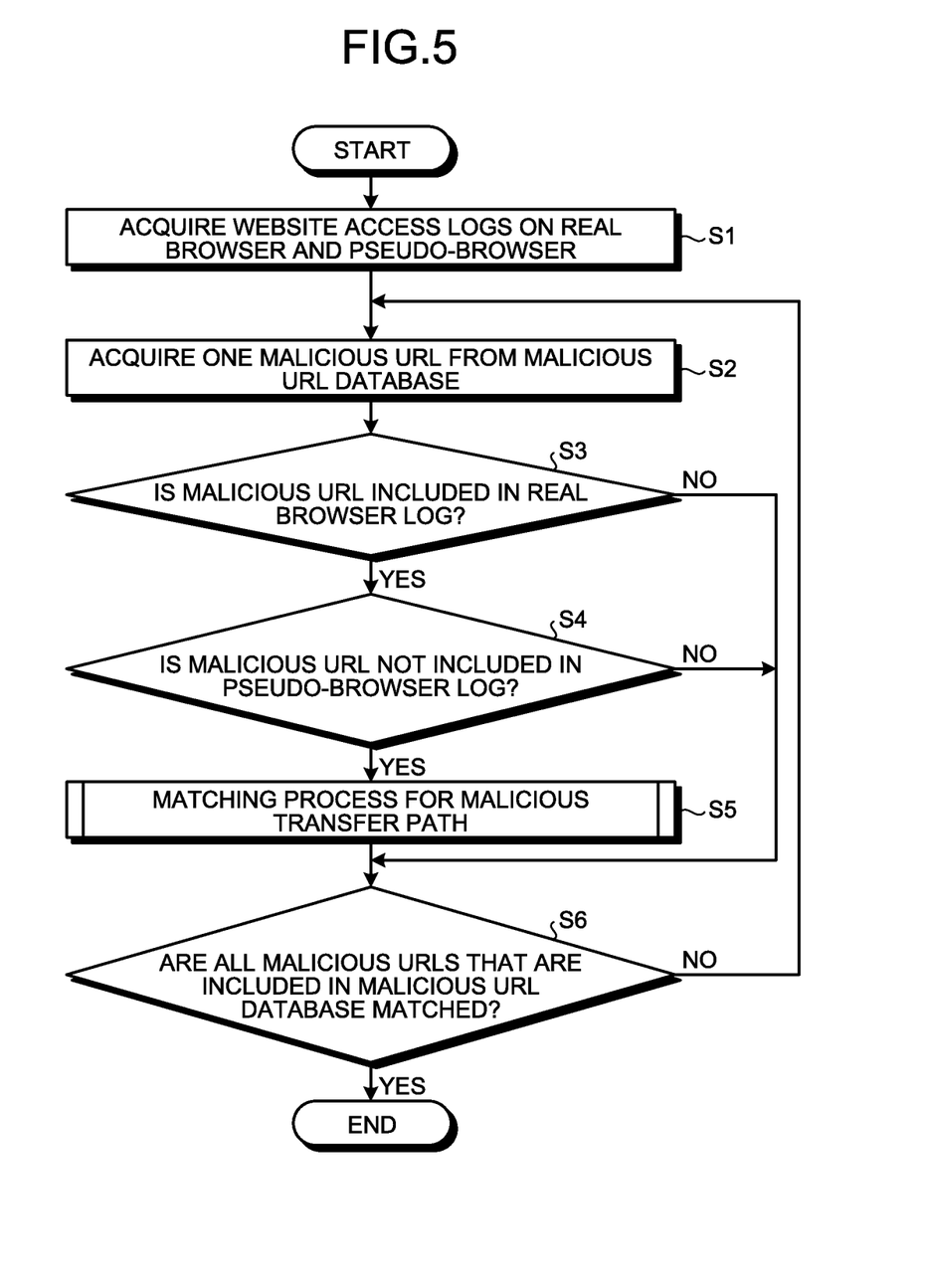
FIG. 5 is a flowchart illustrating process steps of an analysis process before an analysis avoidance code is identified by an analysis apparatus as illustrated in FIG. 1.

FIG. 5 is a flowchart illustrating process steps of an analysis process before an analysis avoidance code is identified by the analysis apparatus 10 as illustrated in FIG. 1.

First, as illustrated in FIG. 5, the transfer path matching unit 151 acquires access logs for a website on a real browser and a pseudo-browser (step S1). In such a case, the transfer path matching unit 151 acquires a real browser log La and a browser emulator log Lb for an identical website as an analysis target. Subsequently, the transfer path matching unit 151 acquires one malicious URL from the malicious URL database 14 (step S2).

Then, the transfer path matching unit 151 determines whether or not the real browser log La that is acquired at step S1 includes a malicious URL that is acquired at step S2 (step S3). In a case where it is determined that the acquired real browser log La includes a malicious URL (step S3: Yes), the transfer path matching unit 151 goes to step S4.

The transfer path matching unit 151 determines whether or not an access log on a pseudo-browser (the browser emulator log Lb) that is acquired at step S1 does not include a malicious URL that is acquired at step S2 (step S4).

In a case where the transfer path matching unit 151 determines that the browser emulator log Lb does not include a malicious URL (step S4: Yes), the transfer path matching unit 151 and the analysis avoidance code identification unit 152 execute a matching process for a malicious transfer path (step S5). In such a process at step S5, the transfer path matching unit 151 and the analysis avoidance code identification unit 152 are provided with, as input, the real browser log La, the browser emulator log Lb, and the JavaScript code information Dc that is executed on a website as an analysis target. Then, in a process at step S5, the transfer path matching unit 151 executes matching of a transfer path in a pseudo-browser log that corresponds to a transfer path to a malicious URL on a real browser and the analysis avoidance code identification unit 152 identifies a terminal URL of the transfer path in the pseudo-browser log that is obtained by the matching. Subsequently, the analysis avoidance code identification unit 152 identifies, as an analysis avoidance code, a JavaScript code that is executed due to access to an identified terminal URL from the executed JavaScript code information Dc.

Then, in a case where it is determined that the acquired real browser log La does not include a malicious URL (step S3: No), a case where it is determined that the browser emulator log Lb includes a malicious URL (step S4: No), or a case where a matching process for a malicious transfer path is ended, the transfer path matching unit 151 goes to step S6. At step S6, The transfer path matching unit 151 determines whether or not matching of all of malicious URLs that are included in the malicious URL database 14 are executed for the acquired real browser log La and browser emulator log Lb (step S6).

In a case where it is determined that not all malicious URLs that are included in the malicious URL database 14 are matched (step S6: No), the transfer path matching unit 151 returns to step S2 and then acquires a malicious URL that is a target of matching from the malicious URL database 14. On the other hand, in a case where it is determined that all malicious URLs that are included in the malicious URL database 14 are matched (step S6: Yes), the transfer path matching unit 151 outputs a result of analysis and ends such an analysis process.

[Process Steps of a Matching Process for Malicious Transfer Path]

Figure 6:
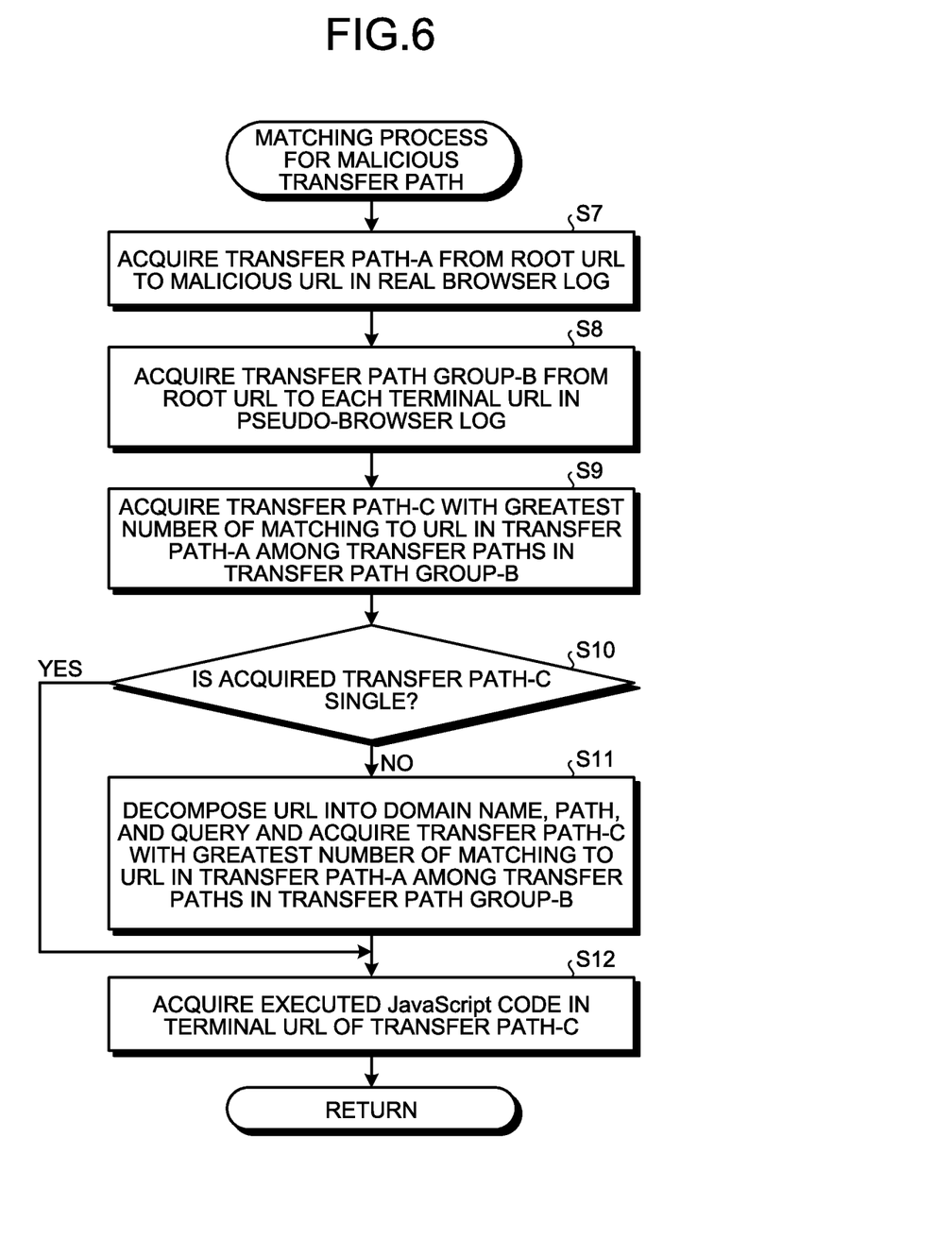
FIG. 6 is a flowchart illustrating process steps of a matching process for a malicious transfer path as illustrated in FIG. 5.

Next, process steps of a matching process for a malicious transfer path as illustrated in FIG. 5 will be explained. FIG. 6 is a flowchart illustrating process steps of a matching process for a malicious transfer path as illustrated in FIG. 5.

First, as illustrated in FIG. 6, the transfer path matching unit 151 acquires a transfer path-A (a list of URLs) from a root URL to a malicious URL in the real browser log La (step S7). Then, the transfer path matching unit 151 acquires a transfer path group-B from a root URL to each terminal URL in an access log on a pseudo-browser (the browser emulator log Lb) (step S8). In such processes at steps S7 and S8, the transfer path matching unit 151 creates a transfer graph based on a transfer source URL information and a transfer destination URL information that are included in an access log as explained by using FIG. 2, and thereby, acquires a transfer path. Alternatively, the transfer path matching unit 151 creates a transfer graph after a URL that is included in an access log is decomposed into a domain name, a path, a query key, and a query value, and thereby, acquires a transfer path.

The transfer path matching unit 151 acquires a transfer path from the acquired transfer path group-B one by one and acquires a transfer path-C with a greatest number of matching to a URL that is included in the transfer path-A (step S9). Then, the transfer path matching unit 151 determines whether or not the acquired transfer path-C is single (step S10).

In a case where it is determined that the acquired transfer path-C is not single, that is, the transfer path-C is multiple (step S10: No), the transfer path matching unit 151 goes to step S11.

At step S11, the transfer path matching unit 151 decomposes URLs that are included in the transfer path-A and the transfer path group-B into domain names, paths, and queries (query keys and query values) and acquires a transfer path-C with a greatest number of matching to a URL in the transfer path-A among transfer paths in the transfer path group-B. That is, at step S11, the transfer path matching unit 151 executes matching of each of a domain name, a path, and a query in the transfer path-A and the transfer path group-B, for each URL, similarly to a matching process for a URL at step S9, and acquires a transfer path-C with a greatest number of matching. The transfer path-C that is acquired by the transfer path matching unit 151 is a specific transfer path that is a transfer path that is not transferred to a malicious URL on a pseudo-browser where the transfer path is transferred to the malicious URL on a real browser.

Additionally, in a case where a single transfer path-C is not determined even though step S11 is executed, the transfer path matching unit 151 provides, as a transfer path-C, for example, one transfer path that is randomly selected from a plurality of transfer paths C.

In a case where the transfer path matching unit 151 determines that the transfer path-C is single (step S10: Yes) or a case where a process at step S11 is ended, the analysis avoidance code identification unit 152 executes a process at step S12. That is, the analysis avoidance code identification unit 152 acquires, as an attack avoidance code, a JavaScript code that is executed by a terminal URL of the transfer path-C that is acquired by the transfer path matching unit 151, among JavaScript codes that are included in the executed JavaScript code information Dc, and ends a matching process for a malicious transfer path.

[Effect of Embodiment]

As described above, in the present embodiment, the real browser log La and the browser emulator log Lb for a URL of a website as an analysis target are provided as input, a transfer path that is not transferred to a malicious URL on a pseudo-browser where the transfer path is transferred to the malicious URL on a real browser is identified as a specific transfer path based on the malicious URL, and an analysis avoidance code among script codes that are executed on such a website is identified based on such an identified transfer path.

Therefore, according to an embodiment, it is possible to identify an analysis avoidance code that avoids analysis by utilizing a browser-specific function or an implementation difference between a real browser and a pseudo-browser where such identification has ever been difficult. Then, according to the present embodiment, an identified analysis avoidance code is analyzed manually or the like, so that it is possible to attain improvement of an efficiency of identification of an analysis avoidance code, generation of a signature for detection of a malicious website, or improvement of a character performance on a pseudo-browser.

Furthermore, in the present embodiment, transfer graphs are respectively created from access longs that are acquired on a real browser and a pseudo-browser that simulates environment of such a real browser and respective transfer paths for created two transfer graphs are matched to one another. As a result, in the present embodiment, it is possible to identify a specific transfer path suitably. Then, in the present embodiment, a terminal URL is obtained in such an identified transfer path and a JavaScript code that is executed due to access to the terminal URL is identified among executed JavaScript codes, so that it is possible to identify an analysis avoidance code suitably.

Furthermore, in the present embodiment, even in a case where a transfer path that is not transferred to a malicious URL on a pseudo-browser where the transfer path is transferred to the malicious URL on a real browser is multiple, a transfer path is decomposed by using a domain name, a path, a query key, and a query value, and further, matching of such a transfer path is executed. Hence, according to the present embodiment, it is possible to identify a specific transfer path suitably and it is also possible to execute identification of an analysis avoidance code suitably.

[System Configuration, Etc.]

Each component of each device as illustrated in a figure is functionally conceptual and does not have to be physically configured as illustrated in such a figure. That is, a specific mode of dispersion or integration of respective devices is not limited to that illustrated in a figure, and it is possible to functionally or physically disperse or integrate and configure all or a part thereof at an arbitrary unit depending on a variety of loads, usage, or the like. Moreover, it is possible to realize all or any part of respective process functions that are executed in respective devices by a CPU and a program that is analyzed and executed by such a CPU or realize it as hardware based on wired logic.

Furthermore, for each process that is explained in the present embodiment, it is possible to manually execute all or a part of a process that is explained as being executed automatically or it is also possible to automatically execute all or a part of a process that is explained as being executed manually, by a publicly known method. Additionally, it is possible to arbitrarily change a process step, a control step, a specific name, or information that includes a variety of data or parameters as indicated in a document or a drawing as mentioned above, unless otherwise stated.

[Program]

Figure 7:
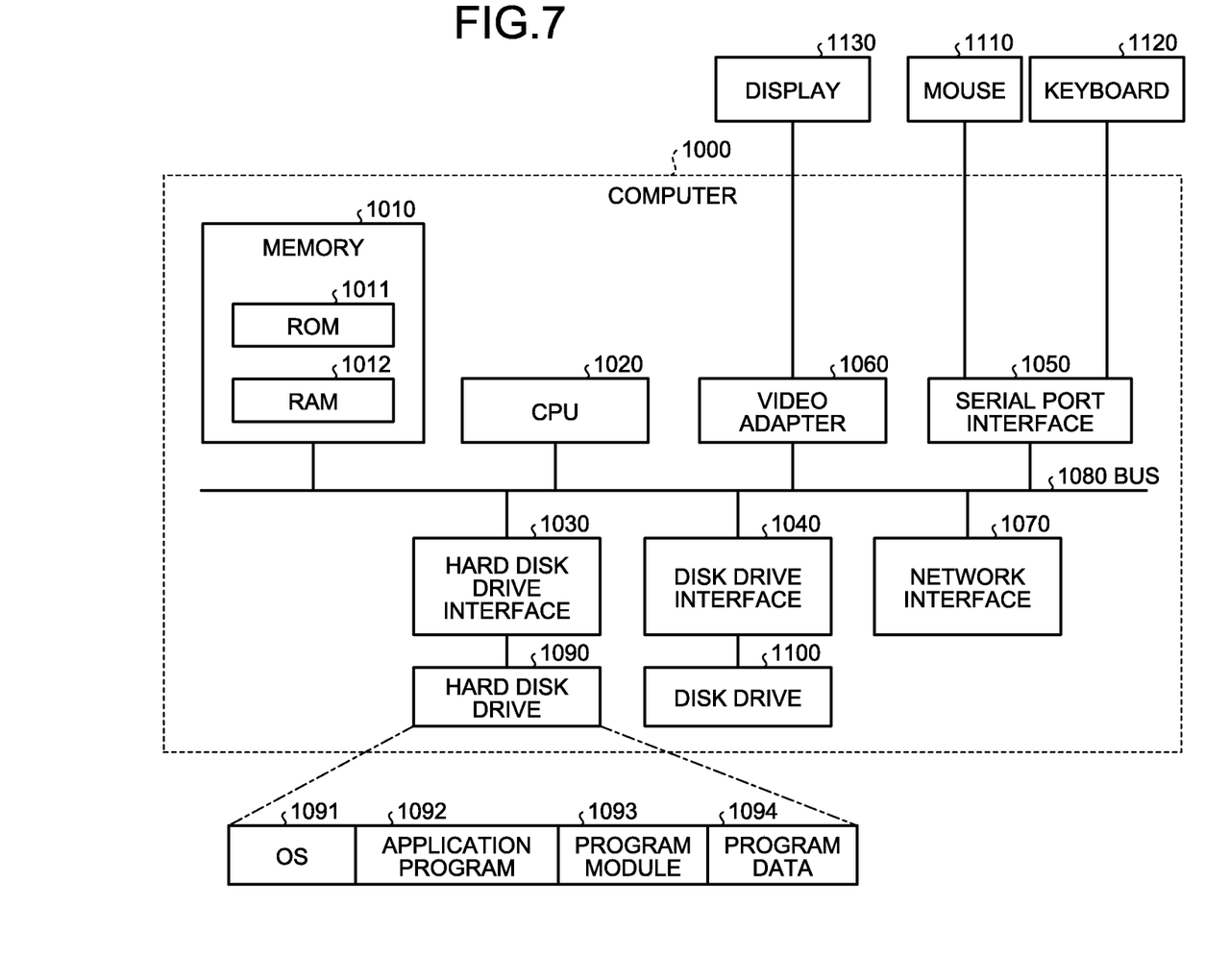
FIG. 7 is a diagram illustrating an example of a computer where a program is executed to realize an analysis apparatus.

FIG. 7 is a diagram illustrating an example of a computer where a program is executed to realize the analysis apparatus 10. A computer 1000 has, for example, a memory 1010 and a CPU 1020. Furthermore, the computer 1000 has a hard disk drive interface 1030, a disk drive interface 1040, a serial port interface 1050, a video adapter 1060, and a network interface 1070. Such respective units are connected by a bus 1080.

The memory 1010 includes a Read Only Memory (ROM) 1011 and a RAM 1012. The ROM 1011 stores, for example, a boot program such as Basic Input Output System (BIOS). The hard disk drive interface 1030 is connected to a hard disk drive 1090. The disk drive interface 1040 is connected to a disk drive 1100. For example, an attachable and detachable storage medium such as a magnetic disk or an optical disk is inserted into the disk drive 1100. The serial port interface 1050 is connected to, for example, a mouse 1110 or a keyboard 1120. The video adapter 1060 is connected to, for example, a display 1130.

The hard disk drive 1090 stores, for example, an OS 1091, an application program 1092, a program module 1093, and program data 1094. That is, a program that defines each process of the analysis apparatus 10 is implemented as a program module 1093 that describes a code capable of being executed by the computer 1000. The program module 1093 is stored in, for example, the hard disk drive 1090. For example, the program module 1093 for executing a process similar to a functional configuration of the analysis apparatus 10 is stored in the hard disk drive 1090. Additionally, the hard disk drive 1090 may be replaced by a Solid State Drive (SSD).

Furthermore, setting data that are used in a process according to an embodiment as described above are stored as program data 1094 in, for example, the memory 1010 or the hard disk drive 1090. Then, the CPU 1020 reads and executes, on the RAM 1012 according to need, the program module 1093 or the program data 1094 that is/are stored in the memory 1010 or the hard disk drive 1090.

Additionally, the program module 1093 or the program data 1094 is/are not limited to a case where storage thereof is executed in the hard disk drive 1090 but may be stored in, for example, an attachable and detachable storage medium and read by the CPU 1020 through the disk drive 1100 or the like. Alternatively, the program module 1093 and the program data 1094 may be stored in another computer that is connected through a network (LAN, WAN, or the like). Then, the program module 1093 and the program data 1094 may be read from another computer by the CPU 1020 through the network interface 1070.

Although an embodiment where the invention that has been provided by the inventor(s) is applied thereto has been explained above, the present invention is not limited by a description(s) and a figure(s) according to the present embodiment that compose the disclosure of the present invention. That is, another embodiment, practical example, operational technique, and the like that are provided by a person skilled in the art or the like based on the present embodiment are all included in the scope of the present invention.

REFERENCE SIGNS LIST

10 Analysis apparatus
11 Input unit
12 Communication unit
13 Storage unit
14 Malicious URL database
15 Control unit
16 Output unit
151 Transfer path matching unit
152 Analysis avoidance code identification unit

The invention claimed is:

1. An analysis apparatus that analyzes a content and a script code on a website, wherein the analysis apparatus comprises:

a memory; and a processor coupled to the memory and programmed to execute a process comprising:

matching that is provided with, as input, an access log for a Uniform Resource Locator (URL) of a website as an analysis target on a real browser that is a browser of a real system and an access log for the URL of a website as an analysis target on a pseudo-browser that simulates environment of the real browser and identifies, as a specific transfer path, a transfer path that is not transferred to a malicious URL on the pseudo-browser where the transfer path is transferred to the malicious URL on the real browser, based on the malicious URL; and identifying an analysis avoidance code that avoids analysis by utilizing a browser-specific function or an implementation difference between the real-browser and the pseudo-browser, among script codes that are executed on the website, based on the specific transfer path, wherein the matching creates respective transfer graphs from the access logs for the real browser and the pseudo-browser and matches respective transfer paths in the created two transfer graphs to one another to identify the specific transfer path.

2. The analysis apparatus according to claim 1, wherein:
the identifying identifies a terminal URL of the specific transfer path and identifies, as the analysis avoidance code, a script code that is executed due to access to the identified terminal URL among the script codes that are executed on the website.

3. The analysis apparatus according to claim 1, wherein the matching matches transfer paths by using at least one of a domain name, a path, a query key, and a query value.

4. The analysis apparatus according to claim 3, wherein the matching executes matching of transfer paths at a granularity of the at least one of a domain name, a path, a query key, and a query value and regards a URL with a greatest number of coincidence at each granularity as identical.

5. An analysis method that is executed by an analysis apparatus that analyzes a content and a script code on a website, wherein the analysis method comprises:

providing for matching, as input, an access log for a URL website as an analysis target on a real browser that is a browser of a real system and an access log for the URL of a website as an analysis target on a pseudo-browser that simulates environment of the real browser and identifying, as a specific transfer path, a transfer path that is not transferred to a malicious URL on the pseudo-browser where the transfer path is transferred to the malicious URL on the real browser, based on the malicious URL; and identifying an analysis avoidance code that avoids analysis by utilizing a browser-specific function or an implementation difference between the real-browser and the pseudo-browser, among script codes that are executed on the website, based on the specific transfer path, wherein the matching creates respective transfer graphs from the access logs for the real browser and the pseudo-browser and matches respective transfer paths in the created two transfer graphs to one another to identify the specific transfer path.

6. A non-transitory computer-readable recording medium having stored therein an analysis program for causing a computer to execute a process comprising:

providing for matching, as input, an access log for a URL of a website as an analysis target on a real browser that is a browser of a real system and an access log for the URL of a website as an analysis target on a pseudo-browser that simulates environment of the real browser and identifying, as a specific transfer path, a transfer path that is not transferred to a malicious URL on the pseudo-browser where the transfer path is transferred to the malicious URL on the real browser, based on the malicious URL; and identifying an analysis avoidance code that avoids analysis by utilizing a browser-specific function or an implementation difference between the real-browser and the pseudo-browser, among script codes that are executed on the website, based on the specific transfer path, wherein the matching creates respective transfer graphs from the access logs for the real browser and the pseudo-browser and matches respective transfer paths in the created two transfer graphs to one another to identify the specific transfer path.

* * * * *